United States Patent Office 3,293,176
Patented Dec. 20, 1966

3,293,176
METHOD OF CHELATING WITH AN ETHER-GROUP-CONTAINING SEQUESTERING AGENT
Le Roy A. White, Root Road, Somers, Conn.
No Drawing. Filed Apr. 1, 1964, Ser. No. 356,629
19 Claims. (Cl. 210—58)

This is a continuation-in-part of application Serial No. 765,924, filed October 8, 1958, and now abandoned.

The present invention relates to sequestering agents and, more particularly, sequestering agents consisting of an ether chelating molecule having carboxylic acid, phosphoric acid and/or sulfonic acid groups thereon.

Sequestering agents, utilized up to the present time, have not proven as efficient or as selective of particular ions as desirable in many cases. In addition, while it has often been desirable in the separation of metals to utilize sequestering agents which show an affinity for particular metals, such sequestering agents have not been available for all the separations desired.

It is therefore an object of the present invention to overcome the disadvantages inherent in the prior art, such as those indicated above.

It is another object of the present invention to provide sequestering agents useful for the textile and soap industries in the preparation of cleaning products.

It is another object of the present invention to provide a new group of metal deactivators and carriers in both aqueous and organic solutions.

It is another object of the present invention to provide new sequestering agents.

It is another object of the present invention to provide sequestering agents which are easily and inexpensively synthesized.

It is another object of the present invention to utilize as sequestering agents, materials which comprise an ether chelating molecule having acid groups thereon.

These and other objects and the nature and advantages of the present invention will be apparent from the following description.

The compounds of the present invention fall within the general formula:

$$M-O-(CHX)_a-(CHY)_b-(CHZ)_c-G$$

wherein M is selected from the group consisting of

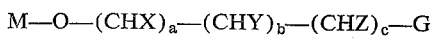

X, Y, and Z are selected from the group consisting of —H, —COOH, and —OH; $a$, $b$, and $c$ are integers of from 0 to 1, at least one member of $a$, $b$, and $c$ being 1; G is selected from the group consisting of

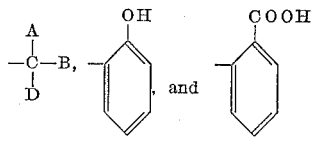

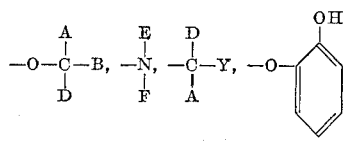

and $-O-(CHX)_a(CHY)_b(CHZ)_c-O-M$

A, B, and D are selected from the group consisting of —CH$_2$COOH, —CH$_2$SO$_3$H, A, B and D together having no more than two of the units —COOH, —H, —SO$_3$H, —PO$_3$H$_2$, —CHOHCOOH,

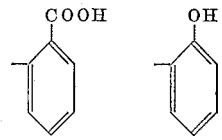

and no more than one unit of $-(CHZ)_c(CHY)_b(CHX)_a-O-M$

E and F are selected from the group consisting of —CH$_2$COOH, —CH(COOH)$_2$, —H, —CH$_2$CH$_2$OH, —CH$_2$CH$_2$OCH$_2$CH$_2$OH

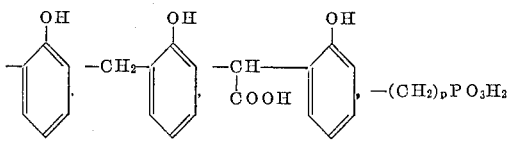

—(CH$_2$)$_p$SO$_3$H, and no more than one unit of

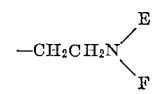

and $p$ is an integer of from 0 to 2.

These materials are all broadly ethers and may be synthesized by the conventional ether producing reactions, such as the Williamson ether synthesis.

The present compounds are more efficient sequestering agents than are the citrates, tartrates and other similar materials. In addition, the present compounds are more useful in metal separations than are the conventional amine sequestering agents, e.g. ethylene diamine tetraacetic acid, since magnesium, calcium, strontium, barium, tin, vanadium, molybdenum, uranium, ferric, and cobaltous ions show a greater affinity for oxygen electron sharing than for nitrogen electron sharing. In addition, the present compounds are particularly useful in ion exchange resins for multivalent metal separations.

The following specific examples are presented by way of illustration only and are not intended as limiting the invention. The compounds of Examples 1, 2, 3, 5, 6, 7, 8, 9, 10, 12 and 13 are produced by the Williamson ether synthesis and when tested provide good sequestering agents.

*Example 1*

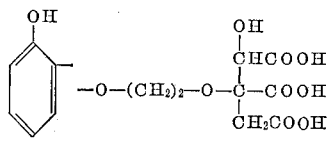

*Example 2*

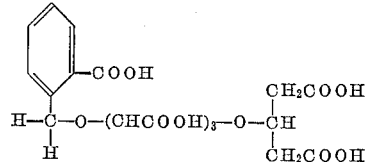

*Example 3*

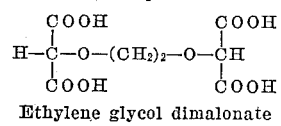

Ethylene glycol dimalonate

Example 4

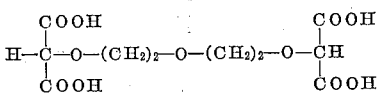

To a three-neck flask, fitted with stirrer, dropping funnel, thermometer, and N₂ inlet was charged 160 gm. sodium carbonate (1 mole), 160 gm. of diethyl malonate (1 mole) and 450 gm. thiophene-free benzene distilled from sodium. 160 gm. of bromine were added slowly over the course of 6 hours. The temperature was maintained at 30–35° C. After an additional 2 hours stirring, all of the bromine color was gone. The bromodiethyl malonate was separated from salts by filtration. To another three-neck flask fitted with stirrer, thermometer, nitrogen inlet, reflux condenser and dropping funnel, was charged 1 mole of lithium dispersion in wax and 250 cc. of sodium dried benzene. Diethylene glycol dried 8 hours in a 60° C. vacuum oven was then added dropwise. The reactor was heated to 37° C. and the glycol feed was started. Temperature was maintained by occasional immersion in a methanol bath at 40° C. After one hour all of the diethylene glycol (½ mol) was added. After an additional 10 minutes, no further cooling was required. The batch was heated over the course of one hour to 54° C. The lithium adduct was a gray thick slurry-solution. The bromo diethyl malonate was then started, but after one-half hour the slurry became extremely thick. It was found that an additional 500 cc. of distilled tetrahydrofurane and a temperature of 70° C. would maintain a fluidized mixture while the additional bromomalonate was added. The bromomalonate was added at 70° C. over an 8-hour period. The mixture was cooled and exposed to the atmosphere for 24 hours in an open tray. Water was added to separate a benzene layer. This benzene layer was found to contain the lithium's paraffin wax. The remainder of the mixture was thinned with 200 cc. of methanol and filtered. 20 cc. of 20% hydrogen peroxide was added, stirred in, 300 cc. water was then stirred in and the mix allowed to settle for 18 hours. The upper layer was discarded and the lower layer was hydrolyzed with a solution of 90 gm. sodium hydroxide, 90 gm. water, 200 cc. methanol. The mixture exothermed and was allowed to stand 18 hours. Water was added to dissolve the mixture and the mixture was heated. The 600 cc. of solution was filtered and heated an additional 4 hours at 60–70° C. Alcohol was then added continuously and three fractions were filtered off. The least soluble fraction was passed through an acidified Dowex 50 (sulfonated polystyrene) ion exchange column. The effluent was evaporated and found to be malonic acid. The second fraction was passed through an ion-exchange column and evaporated. The product was a thick yellow liquid with some crystals. The product was dissolved in acetone and the acetone evaporated. The product was titrated with sodium hydroxide, found 70.3 gm. per carboxyl (77 g. theoretical). The product was titrated with ferric chloride at a pH of 4, salicylic acid indicator, found 1.1 moles Fe ion per 310 gms. (one mole theoretically). The third fraction was apparently either decarboxylated malonate-glycol-malonate, or partly reacted glycol malonate. Two fractions were isolated therefrom, fraction (a) insoluble in cold acetone, sodium hydroxide titre 230 gm. per carboxyl; and fraction (b) soluble in acetone, 120 gm. per carboxyl.

Example 5

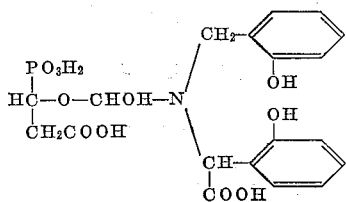

Example 6

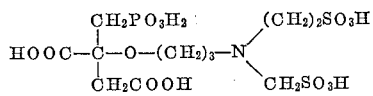

Example 7

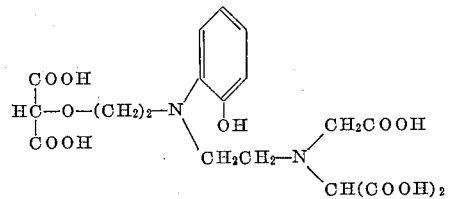

Example 8

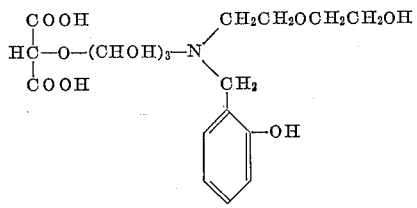

Example 9

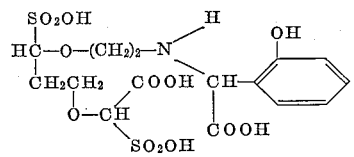

Example 10

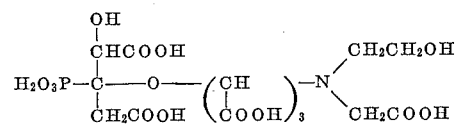

Example 11

Two moles of salicyclic acid and 1 mole of epichlorohydrin are reacted readily at a pH of 10 to form the compound

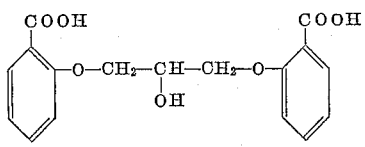

This compound is found to have good sequestering properties.

Example 12

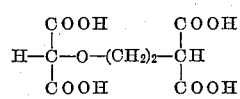

Example 13

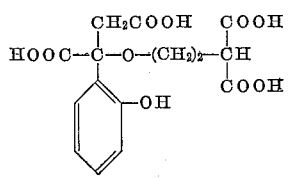

Example 14

Citric acid is reacted with HBr to form citric bromide which in turn is reacted with alkaline salicylic acid.

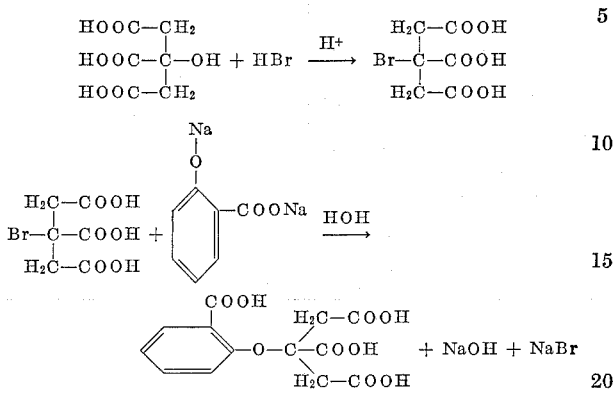

The compounds of the following Examples 15 and 17 are also prepared by the Williamson ether synthesis and are found to be excellent sequestering agents:

Example 15

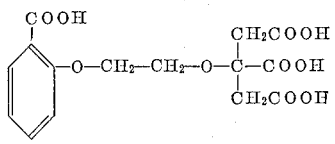

Example 16

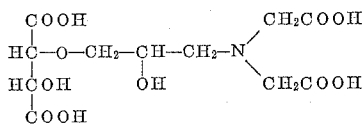

Example 17

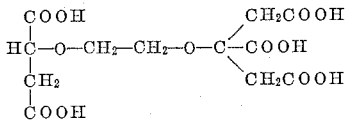

Example 18

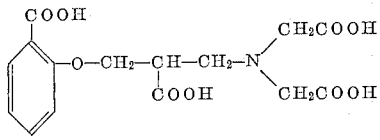

It will be obvious to those skilled in the art that various changes may be made without departing from the spirit of the invention and therefore the invention is not limited to what is described in the specification, but only as indicated in the appended claims.

What is claimed is:

1. The method of treating liquid media to chelate ions therefrom which comprises contacting said media with a sequestering agent of the formula:

$$M-O-(CHX)_a(CHY)_b(CHZ)_c-G$$

wherein M is selected from the group consisting of

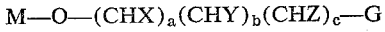

X, Y, and Z are selected from the group consisting of —H, —COOH, and —OH;

$a$, $b$, and $c$ are integers of from 0 to 1, at least one member of $a$, $b$, and $c$ being 1;

G is selected from the group consisting of

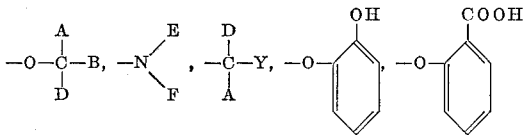

and $-O-(CHX)_a(CHY)_b(CHZ)_c-O-M$;

A, B, and D are selected from the group consisting of —CH$_2$COOH, —CH$_2$SO$_3$H, A, B and D together having no more than two of the units —COOH, —H, —SO$_3$H, —PO$_3$H$_2$, —CHOHCOOH,

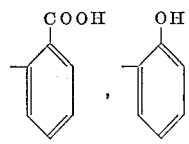

and no more than one unit of $$-(CHZ)_c(CHY)_b(CHX)_a-O-M$$

E and F are selected from the group consisting of —CH$_2$COOH, —CH(COOH)$_2$, —H, —CH$_2$CH$_2$OH, —CH$_2$CH$_2$OCH$_2$CH$_2$OH,

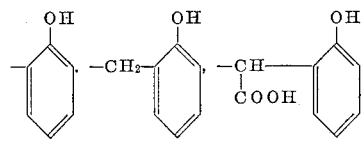

—(CH$_2$)$_p$PO$_3$H$_2$, —(CH$_2$)$_p$SO$_3$H, and E and F together having no more than one unit of

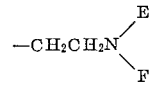

$p$ being an integer of from 0 to 2.

2. The method of treating liquid media to chelate ions therefrom which comprises contacting said media with a sequestering agent of the formula:

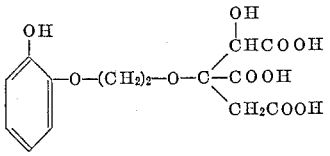

3. The method of treating liquid media to chelate ions therefrom which comprises contacting said media with a sequestering agent of the formula:

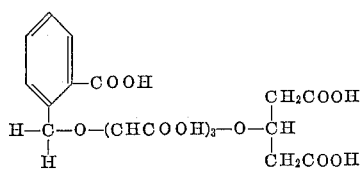

4. The method of treating liquid media to chelate ions therefrom which comprises contacting said media with a sequestering agent of the formula:

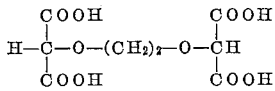

5. The method of treating liquid media to chelate ions therefrom which comprises contacting said media with a sequestering agent of the formula:

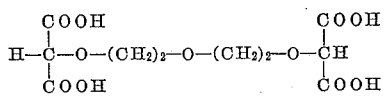

6. The method of treating liquid media to chelate ions therefrom which comprises contacting said media with a sequestering agent of the formula:

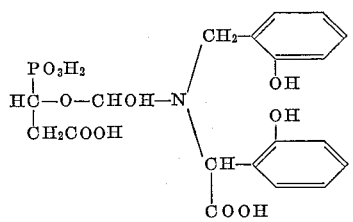

7. The method of treating liquid media to chelate ions therefrom which comprises contacting said media with a sequestering agent of the formula:

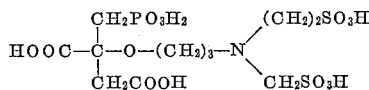

8. The method of treating liquid media to chelate ions therefrom which comprises contacting said media with a sequestering agent of the formula:

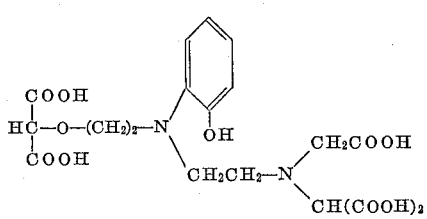

9. The method of treating liquid media to chelate ions therefrom which comprises contacting said media with a sequestering agent of the formula:

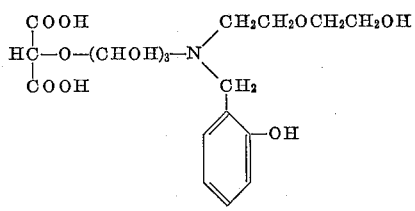

10. The method of treating liquid media to chelate ions therefrom which comprises contacting said media with a sequestering agent of the formula:

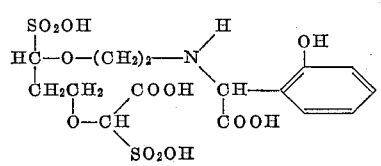

11. The method of treating liquid media to chelate ions therefrom which comprises contacting said media with a sequestering agent of the formula:

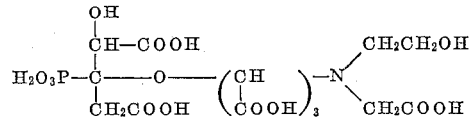

12. The method of treating liquid media to chelate ions therefrom which comprises contacting said media with a sequestering agent of the formula:

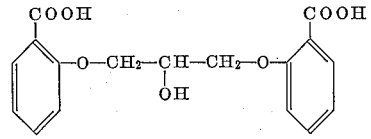

13. The method of treating liquid media to chelate ions therefrom which comprises contacting said media with a sequestering agent of the formula:

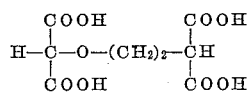

14. The method of treating liquid media to chelate ions therefrom which comprises contacting said media with a sequestering agent of the formula:

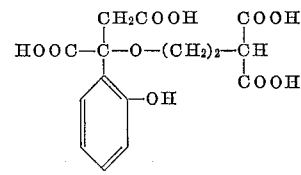

15. The method of treating liquid media to chelate ions therefrom which comprises contacting said media with a sequestering agent of the formula:

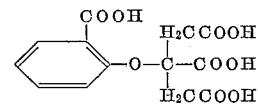

16. The method of treating liquid media to chelate ions therefrom which comprises contacting said media with a sequestering agent of the formula:

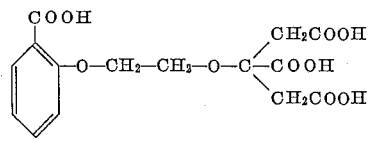

17. The method of treating liquid media to chelate ions therefrom which comprises contacting said media with a sequestering agent of the formula:

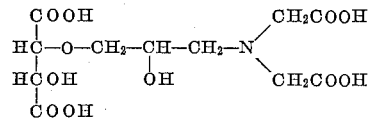

18. The method of treating liquid media to chelate ions therefrom which comprises contacting said media with a sequestering agent of the formula:

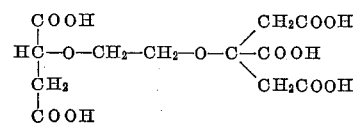

19. The method of treating liquid media to chelate ions therefrom which comprises contacting said media with a sequestering agent of the formula:

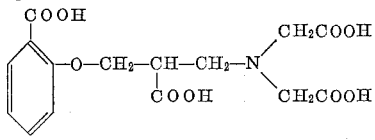

References Cited by the Examiner

UNITED STATES PATENTS

| | | | |
|---|---|---|---|
| 59,418 | 11/1866 | Lawrence | 210—58 |
| 2,240,957 | 5/1941 | Munz | 252—117 |
| 2,311,008 | 2/1943 | Tucker | 210—58 |
| 2,575,298 | 11/1951 | Ryznar | 252—321 |
| 2,727,867 | 12/1955 | Denman | 252—321 |
| 2,868,724 | 1/1959 | Zech | 210—58 |
| 2,894,905 | 7/1959 | Bernard | 210—58 |
| 3,130,153 | 4/1964 | Keller | 210—58 |
| 3,234,124 | 2/1966 | Irani | 210—38 |

FOREIGN PATENTS 677,600   6/1939   Germany.

MORRIS O. WOLK, *Primary Examiner*

LORRAINE A. WEINBERGER, M. WEBSTER,
*Assistant Examiners.*